United States Patent [19]

Nakamura et al.

[11] Patent Number: 5,663,501
[45] Date of Patent: Sep. 2, 1997

[54] METHOD AND APPARATUS FOR DETERMINING SEISMIC VULNERABILITY OF A STRUCTURE

[75] Inventors: Yutaka Nakamura, Sagamihara; Fumiaki Uehan, Kokubunji; Masayuki Nishinaga, Iruma, all of Japan

[73] Assignees: Railway Technical Research Institute and Co., Ltd.; System and Data Research, both of Japan

[21] Appl. No.: 667,000

[22] Filed: Jun. 20, 1996

[30] Foreign Application Priority Data

Jul. 27, 1995 [JP] Japan ............................ 7-190947
May 27, 1996 [JP] Japan ............................ 8-131704

[51] Int. Cl.$^6$ ........................................ G01M 7/02
[52] U.S. Cl. ................................. 73/579; 73/594
[58] Field of Search ........................ 73/579, 594, 654, 73/659, 786; 364/508

[56] References Cited

U.S. PATENT DOCUMENTS 5,255,565 10/1993 Judd et al. ........................... 73/579
5,578,756 11/1996 Nakamura et al. .................. 73/594

*Primary Examiner*—John E. Chapman
*Attorney, Agent, or Firm*—Lorusso & Loud

[57] ABSTRACT

In order to determine the seismic vulnerability of a structure, a vibration sensor is placed on each of the top surface of a layer of the structure and the ground surface near the structure so as to record vibrations. A seismic vulnerability data processor assumes a transfer function of vibration of the top surface of the layer of the structure based on a spectral ratio between the vibration recorded on the top surface of the layer of the structure and the vibration recorded on the ground surface, thereby obtaining a predominant frequency and amplification factor of vibration of the top surface of the layer of the structure. A seismic vulnerability index of the layer of the structure resulting from a deformation of the layer is obtained based on the obtained predominant frequency and amplification factor of vibration of the top surface of the layer of the structure and on the height of the layer of the structure. This seismic vulnerability index is multiplied by an assumed seismic acceleration so as to obtain a maximum shear strain of the layer of the structure upon being subjected to an earthquake.

14 Claims, 4 Drawing Sheets

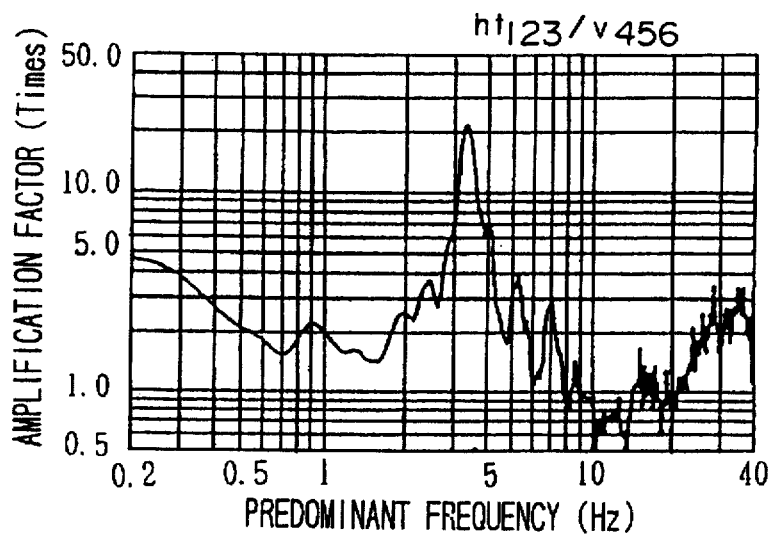
FIG. 7
FIG. 8
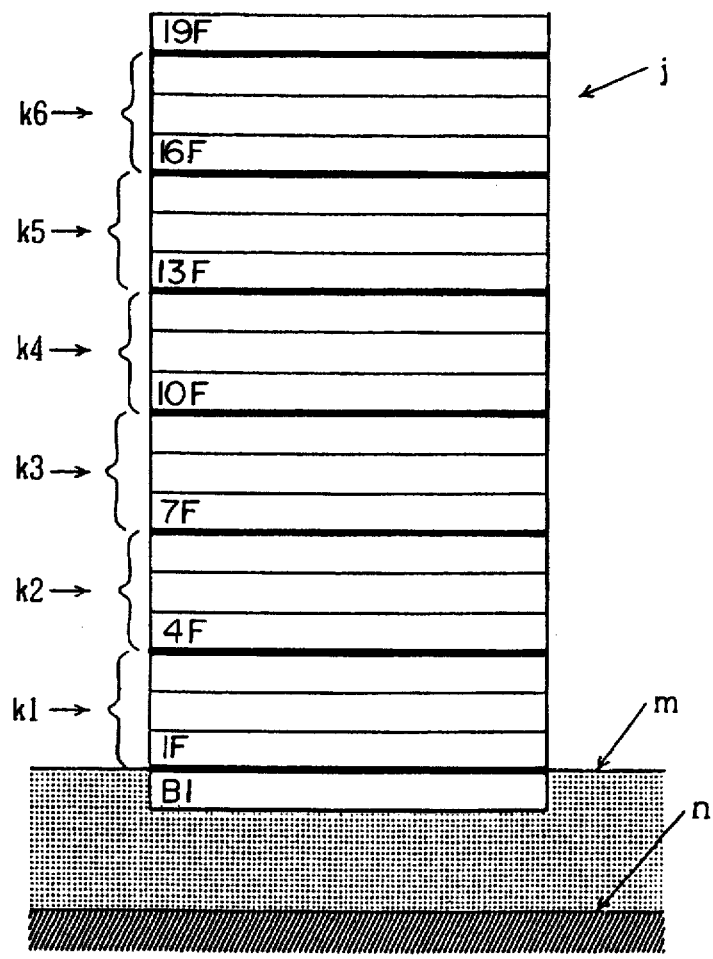

METHOD AND APPARATUS FOR DETERMINING SEISMIC VULNERABILITY OF A STRUCTURE

BACKGROUND OF THE INVENTION

1. Field of the Invention

The present invention relates to a method and apparatus for determining the vulnerability of a structure to earthquake.

2. Description of the Related Art

Conventionally, as methods for determining the seismic vulnerability of a structure are used (1) a method of obtaining the natural frequency of a structure by vibrating the structure, (2) a method of evaluating the antiseismic performance of a structure using a checklist, and (3) an antiseismic diagnostic method of calculating an antiseismic index through structural computation.

In method (1), a method of obtaining the natural frequency of a structure by vibrating the structure, a structure is vibrated using a vibration generator or a weight to give a shock, and then the natural frequency of the structure is obtained based on thus generated vibration. This natural frequency is compared with a reference value to determine the antiseismic performance of the structure.

In method (2), a method of evaluating the antiseismic performance of a structure using a checklist, a structure is evaluated using a checklist containing predetermined items such as conditions of the ground underneath the structure, year of construction of the structure, and structural Specifications. The antiseismic performance of the structure is determined based on total points assigned in the case of this evaluation.

In method (3), an antiseismic diagnostic method of calculating the antiseismic index of a structure through structural computation, any of the following three methods are used, depending on the specific case. In the first method, the ultimate strength of each layer is calculated based on the cross-sectional areas of walls and columns. In the second method, the flexural strength of each layer is obtained based on the assumption that beams and floor slabs are rigid as well as on the basis of calculated bends of individual columns and walls and calculated ultimate shear strength of the layer, and subsequently the toughness of each layer is calculated based on the relationship between this flexural strength and the ultimate shear strength, quantity of reinforcing bars, and the like. In the third method, a simple nonlinear frame analysis is conducted while taking into consideration the strength and toughness of beams.

The above-mentioned methods for determining the seismic vulnerability of a structure have included the following problems.

In the method of obtaining the natural frequency of a structure by vibrating the structure, a large-scale apparatus is required for vibrating the structure, and the structure may be damaged when the apparatus is installed or when a shock is given to the structure. Also, this method requires a reference natural frequency as a basis of comparison, such as a theoretical natural frequency, an empirically derived natural frequency, or a natural frequency measured in the past.

In the method of evaluating the antiseismic performance of a structure using a checklist, the evaluation is rough and susceptible to the subjectivity of an examiner; the vibration characteristics of the structure cannot be obtained quantitatively.

In the antiseismic diagnostic method of calculating the antiseismic index of a structure through structural computation, investigation for obtaining data for use in structural computation and entry of the thus obtained data require considerable time and expenses. Further, the diagnosis requires high-level knowledge of structural computation, so participation of a specialist is indispensable.

SUMMARY OF THE INVENTION

An object of the present invention is to solve the above-mentioned problems in the conventional methods for determining the seismic vulnerability of a structure, and to provide a method and apparatus for quantitatively evaluating the seismic vulnerability of a structure solely by recording vibration using vibration sensors installed on the structure and subsequently performing simple calculation of the obtained data.

To achieve the above object, according to a first aspect of the present invention, there is provided a method for determining the seismic vulnerability of a structure, which comprises the steps of: (a) placing a vibration sensor on each of the top surface of a layer of the structure and the ground surface near the structure so as to record vibrations; (b) estimating a transfer function of vibration of the top surface of the layer of the structure based on a spectral ratio between the vibration recorded on the top surface of the layer of the structure and the vibration recorded on the ground surface near the structure, thereby obtaining a predominant frequency and amplification factor of vibration of the top surface of the layer of the structure; (c) obtaining a seismic vulnerability index of the layer of the structure resulting from a deformation of the layer based on the obtained predominant frequency and amplification factor of vibration of the top surface of the layer of the structure and on the height of the layer of the structure; and (d) multiplying this seismic vulnerability index by an assumed seismic acceleration, thereby obtaining a maximum shear strain of the layer of the structure upon being subjected to an earthquake.

Preferably, the seismic vulnerability index of the layer of the structure is obtained using a predominant frequency and an amplification factor which are obtained based on a spectral ratio between the horizontal component of the vibration recorded on the top surface of the layer of the structure and the horizontal component of the vibration recorded on the ground surface near the structure. This seismic vulnerability index is multiplied by an assumed maximum ground surface seismic acceleration upon being subjected to an earthquake, thereby obtaining the shear strain of the layer of the structure.

Preferably, the seismic vulnerability index of the layer of the structure is obtained using a predominant frequency which is obtained based on a spectral ratio between the horizontal component of the vibration recorded on the top surface of the layer of the structure and the horizontal component of the vibration recorded on the ground surface near the structure, as well as using an amplification factor which is obtained based on a spectral ratio between the horizontal component of the vibration recorded on the top surface of the layer of the structure and the vertical component of the vibration recorded on the ground surface near the structure. In this calculation, amplification of seismic motion of a surface layer is taken into consideration. The seismic vulnerability index is multiplied by an assumed maximum basement seismic acceleration upon being subjected to an earthquake, thereby obtaining the shear strain of the layer of the structure.

According to a second aspect of the present invention, there is provided a method for determining the seismic vulnerability of a structure, which comprises the steps of: (a) placing a vibration sensor on each of the top surface of a layer of the structure, the bottom surface of the layer of the structure, and the ground surface near the structure so as to record vibrations; (b) estimating a transfer function of vibration of the top surface of the layer of the structure based on a spectral ratio between the vibration recorded on the top surface of the layer of the structure and the vibration recorded on the ground surface near the structure, thereby obtaining a predominant frequency and amplification factor of vibration of the top surface of the layer of the structure; (c) estimating a transfer function of vibration of the bottom surface of the layer of the structure based on a spectral ratio between the vibration recorded on the bottom surface of the layer of the structure and the vibration recorded on the ground surface near the structure, thereby obtaining a predominant frequency and amplification factor of vibration of the bottom surface of the layer of the structure; (d) obtaining a seismic vulnerability index of the layer of the structure resulting from a deformation of the layer based on the obtained predominant frequency and amplification factor of vibration of the top surface of the layer of the structure, on the obtained predominant frequency and amplification factor of vibration of the bottom surface of the layer of the structure, and on height of the layer of the structure; and (e) multiplying this seismic vulnerability index by an assumed seismic acceleration, thereby obtaining a shear strain of the layer of the structure.

Preferably, the seismic vulnerability index of the layer of the structure is obtained using a predominant frequency and an amplification factor which are obtained based on a spectral ratio between the horizontal component of the vibration recorded on the top and bottom surfaces of the layer of the structure and the horizontal component of the vibration recorded on the ground surface near the structure. This seismic vulnerability index is multiplied by an assumed maximum ground surface seismic acceleration upon being subjected to an earthquake, thereby obtaining the shear strain of the layer of the structure.

Preferably, the seismic vulnerability index of the layer of the structure is obtained using a predominant frequency which is obtained based on a spectral ratio between the horizontal component of the vibration recorded on the top and bottom surfaces of the layer of the structure and the horizontal component of the vibration recorded on the ground surface near the structure, as well as using an amplification factor which is obtained based on a spectral ratio between the horizontal component of the vibration recorded on the top and bottom surfaces of the layer of the structure and the vertical component of the vibration recorded on the ground surface near the structure. In this calculation, amplification of seismic motion of a surface layer is taken into consideration. The seismic vulnerability index is multiplied by an assumed maximum basement seismic acceleration upon being subjected to an earthquake, thereby obtaining the shear strain of the layer of the structure.

Preferably, the vibrations are microtremors.

According to a third aspect of the present invention, there is provided an apparatus for determining the seismic vulnerability of a structure which comprises (a) a first vibration sensor for recording vibration, which is placed on the top surface of a layer of a structure, (b) a second vibration sensor for recording vibration, which is placed on the ground surface near the structure, and (c) a seismic vulnerability data processor, which is connected to the vibration sensors and which determines the seismic vulnerability of the structure based on the recorded vibration. The seismic vulnerability data processor carries out processing for estimating a transfer function of vibration of the top surface of the layer of the structure based on a spectral ratio between the vibration recorded by the first vibration sensor and the vibration recorded by the second vibration sensor, thereby obtaining a predominant frequency and amplification factor of vibration of the top surface of the layer of the structure; for obtaining a seismic vulnerability index of the layer of the structure resulting from a deformation of the layer, based on the obtained predominant frequency and amplification factor of vibration of the top surface of the layer of the structure and on the height of the layer of the structure; and for multiplying this seismic vulnerability index by an assumed seismic acceleration, thereby obtaining a maximum shear strain of the layer of the structure upon being subjected to an earthquake.

Preferably, the seismic vulnerability data processor is adapted to carry out the following procedure. The seismic vulnerability index of the layer of the structure is obtained using a predominant frequency and an amplification factor which are obtained based on a spectral ratio between the horizontal component of the vibration recorded on the top surface of the layer of the structure and the horizontal component of the vibration recorded on the ground surface near the structure. This seismic vulnerability index is multiplied by an assumed maximum ground surface seismic acceleration upon being subjected to an earthquake, thereby obtaining the shear strain of the layer of the structure.

Preferably, the seismic vulnerability data processor is adapted to carry out the following procedure. The seismic vulnerability index of the layer of the structure is obtained using a predominant frequency which is obtained based on a spectral ratio between the horizontal component of the vibration recorded on the top surface of the layer of the structure and the horizontal component of the vibration recorded on the ground surface near the structure, as well as using an amplification factor which is obtained based on a spectral ratio between the horizontal component of the vibration recorded on the top surface of the layer of the structure and the vertical component of the vibration recorded on the ground surface near the structure. In this calculation, amplification of seismic motion of a surface layer is taken into consideration. The seismic vulnerability index is multiplied by an assumed maximum basement seismic acceleration upon being subjected to an earthquake, thereby obtaining the shear strain of the layer of the structure.

According to a fourth aspect of the present invention, there is provided an apparatus for determining the seismic vulnerability of a structure of the present invention comprises (a) a first vibration sensor for recording vibration which is placed on the top surface of a layer of the structure, (b) a second vibration sensor for recording vibration which is placed on the bottom surface of the layer of the structure, (c) a third vibration sensor for recording vibration which is placed on the ground surface near the structure, and (d) a seismic vulnerability data processor which is connected to the vibration sensors and which determines the seismic vulnerability of the structure based on the recorded vibration. The seismic vulnerability data processor carries out processing for estimating a transfer function of vibration of the top surface of the layer of the structure based on a spectral ratio between the vibration recorded by the first vibration sensor and the vibration recorded by the third vibration sensor, thereby obtaining a predominant frequency and amplification factor of vibration of the top surface of the layer of the structure; for estimating a transfer function of vibration of the bottom surface of the layer of the structure based on a spectral ratio between the vibration recorded by the second vibration sensor and the vibration recorded by the third vibration sensor, thereby obtaining a predominant frequency and amplification factor of vibration of the bottom surface of the layer of the structure; for obtaining a seismic vulnerability index of the layer of the structure resulting from a deformation of the layer based on the obtained predominant frequency and amplification factor of vibration of the top surface of the layer of the structure, on the obtained predominant frequency and amplification factor of vibration of the bottom surface of the layer of the structure, and on the height of the layer of the structure; and for multiplying this seismic vulnerability index by an assumed seismic acceleration, thereby obtaining a shear strain of the layer of the structure.

Preferably, the seismic vulnerability data processor is adapted to carry out the following procedure. The seismic vulnerability index of the layer of the structure is obtained using a predominant frequency and an amplification factor which are obtained based on a spectral ratio between the horizontal component of the vibration recorded on the top and bottom surfaces of the layer of the structure and the horizontal component of the vibration recorded on the ground surface near the structure. This seismic vulnerability index is multiplied by an assumed maximum ground surface seismic acceleration upon being subjected to an earthquake, thereby obtaining the shear strain of the layer of the structure.

Preferably, the seismic vulnerability data processor is adapted to carry out the following procedure. The seismic vulnerability index of the layer of the structure is obtained using a predominant frequency which is obtained based on a spectral ratio between the horizontal component of the vibration recorded on the top and bottom surfaces of the layer of the structure and the horizontal component of the vibration recorded on the ground surface near the structure, as well as using an amplification factor which is obtained based on a spectral ratio between the horizontal component of the vibration recorded on the top and bottom surfaces of the layer of the structure and the vertical component of the vibration recorded on the ground surface near the structure. In this calculation, amplification of seismic motion of a surface layer is taken into consideration. This seismic vulnerability index is multiplied by an assumed maximum basement seismic acceleration upon being subjected to an earthquake, thereby obtaining the shear strain of the layer of the structure.

Preferably, the vibration sensors are those for detecting microtremors.

Accordingly, the present invention provides the following effects.

Seismic vulnerability can be readily determined without using an apparatus for vibrating a structure. Further, since a shear strain upon being subjected to an earthquake can be obtained, the seismic vulnerability of a structure can be determined quantitatively.

Seismic vulnerability can be determined merely by carrying out simple measurement and calculation without conducting detailed investigation of an object structure. Further, no specialist is required to participate in determination of seismic vulnerability. Thus, the seismic vulnerability of a structure can be determined in a shorter period of time and at lower cost.

Since actual vibration regarding a structure is used, an absolute evaluation is possible which takes into consideration deterioration, poor construction work, and other like factors of a structure.

BRIEF DESCRIPTION OF THE DRAWINGS

The structure and features of the method for determining the seismic vulnerability of a structure and the apparatus therefor according to the present invention will be readily appreciated as the same becomes better understood by referring to the drawings, in which:

FIG. 7 is a graph of a spectral ratio between the horizontal component of microtremors recorded on the second floor of the house of FIG. 5 and the vertical component of microtremors recorded on ground surface d of FIG. 5 (an estimated transfer function of vibration traveling from the basement to the second floor) according to the third embodiment; and FIG. 8 is a schematic view of a high-rise building used for explaining a fourth embodiment of the present invention.

DESCRIPTION OF THE PREFERRED EMBODIMENTS

Embodiments of the present invention will next be described in detail with reference to the drawings.

First will be described a method for obtaining the seismic vulnerability of a first layer (a layer in contact with the ground) of a structure.

Figure 1:
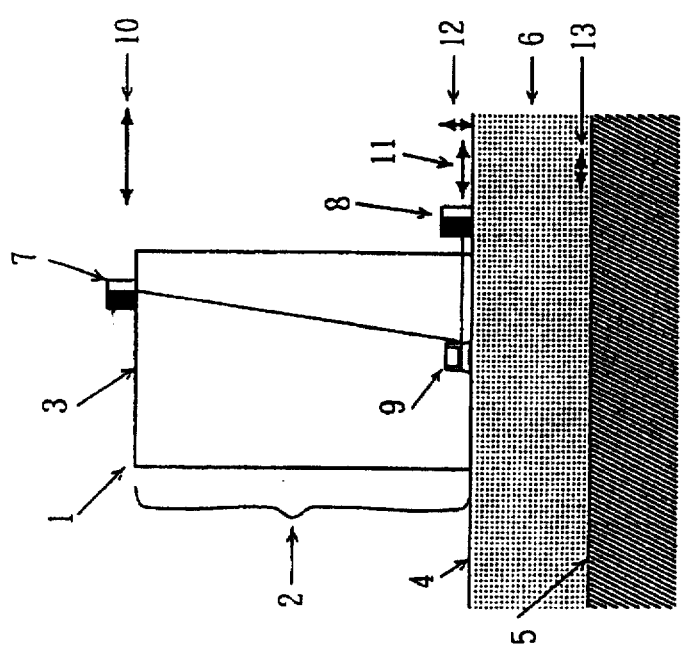
FIG. 1 is an explanatory diagram illustrating a first embodiment of the present invention, in which vibrations are measured to determine the seismic vulnerability of a first layer (a layer in contact with the ground) of a structure.
Figure 2:
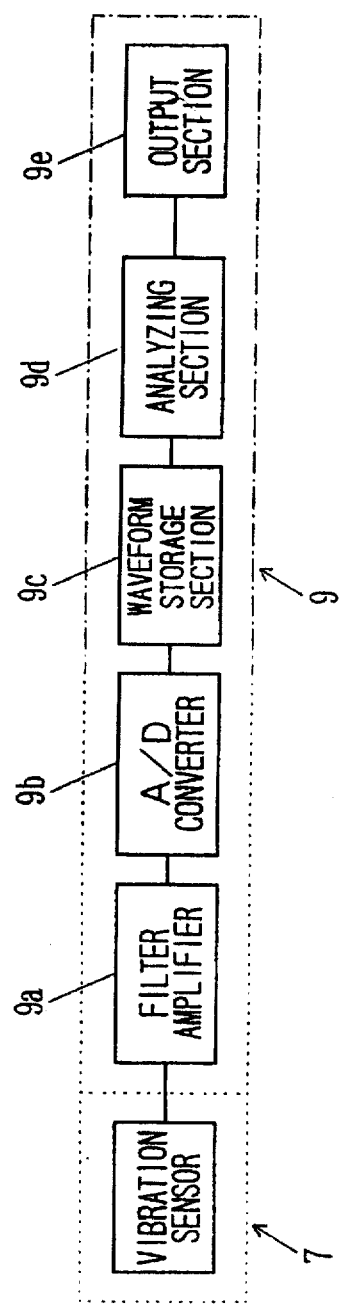
FIG. 2 is a block diagram illustrating the method for determining seismic vulnerability according to the first embodiment.
Figure 3:
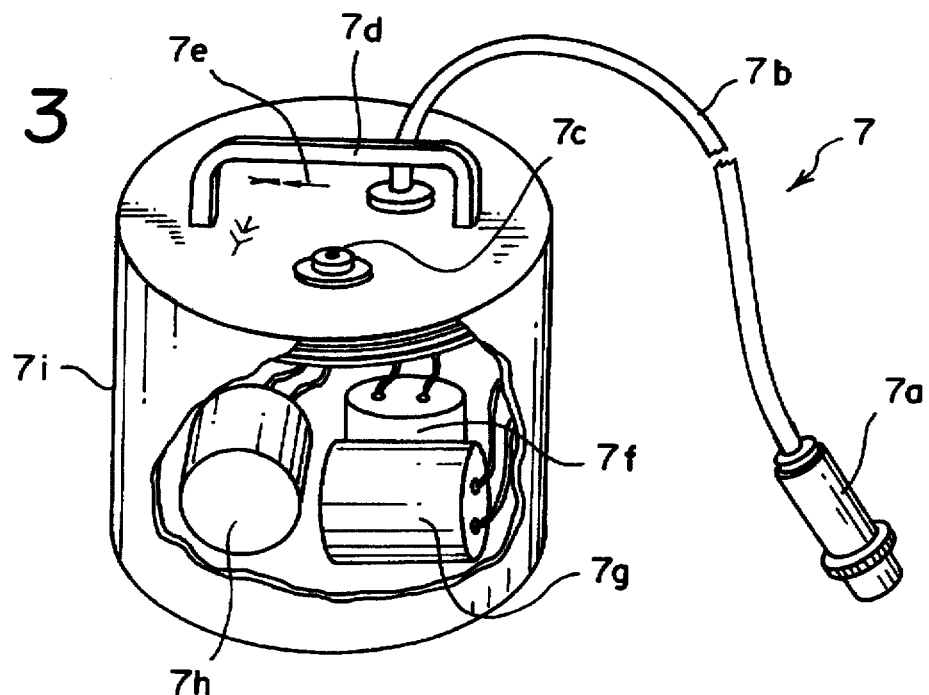
FIG. 3 is a view showing the structure of a vibration sensor used in the method for determining seismic vulnerability according to the first embodiment.

FIG. 1 shows a first embodiment of the present invention, in which vibrations are measured to determine the seismic vulnerability of the first layer (a layer in contact with the ground) of the structure by the method according to a first embodiment of the present invention. FIG. 2 shows a block diagram illustrating a method for determining seismic vulnerability. FIG. 3 shows the structure of a vibration sensor.

As shown in FIG. 1, when the seismic vulnerability of a structure 1 is to be determined, a vibration sensor 7 is placed on a top surface 3 of a layer 2 of the structure 1, and a vibration sensor 8 is placed on a ground surface 4 near the structure 1.

The structure of the vibration sensor 7 will now be described with reference to FIG. 3. The vibration sensor 8 has the same structure as that of the vibration sensor 7 and can obtain vibration data (for example, data regarding microtremors).

The vibration sensor 7 is composed of a connector 7a for supplying power thereto and for outputting vibration data therefrom, a cord 7b connected to the connector 7a, a level 7c provided on a case 7i, a handle 7d, a polarity mark 7e, a vertical (direction Z) vibration detector 7f, a horizontal (direction X) vibration detector 7g, and a horizontal (direction Y) vibration detector 7h.

The vibration sensor 7 is oriented such that the horizontal components of vibration detected thereby are in the directions of vibration used for determining seismic vulnerability.

In this method for determining seismic vulnerability, as shown in FIG. 2, vibration data obtained by the vibration sensor 7 (or 8) is read into a seismic vulnerability data processor 9. The seismic vulnerability data processor 9 is composed of a filter amplifier 9a, an A/D converter 9b, a waveform storage section 9c, an analyzing section 9d, and an output section 9e.

As shown in FIG. 1, a transfer function of vibration traveling from the ground surface 4 to the top surface 3 is estimated based on a spectral ratio between a horizontal component 10 of vibration recorded by the vibration sensor 7 placed on the top surface 3 and a horizontal component 11 of vibration recorded by the vibration sensor 8 placed on the ground surface 4. The predominant frequency $F_s$ and amplification factor $A_s$ of vibration traveling from the ground surface 4 to the top surface 3 are obtained based on the peak value of the estimated transfer function.

In view of the fact that the horizontal component of vibration of a basement 5 is substantially identical to the vertical component thereof and that the vertical component is not amplified much by the surface layer, the spectrum of a horizontal component 13 of vibration at the basement 5 can be approximated by the spectrum of a vertical component 12 of the vibration recorded on the ground surface 4. Accordingly, a transfer function of vibration traveling from the basement 5 to the top surface 3 can be estimated based on the spectral ratio between the horizontal component 10 of the vibration recorded on the top surface 3 and the vertical component 12 of the vibration recorded on the ground surface 4. The amplification factor $A_{sg}$ of vibration traveling from the basement 5 to the top surface 3 can be obtained based on the peak value of this estimated transfer function. Reference numeral 6 denotes a surface layer.

A maximum ground surface seismic acceleration $\alpha_s$, a maximum basement seismic acceleration $\alpha_b$, and a maximum seismic acceleration $\alpha$ of the top surface 3, which are predicted to be produced upon being subjected to an earthquake, hold the relation as expressed by Eq. (1) below.

$$\begin{aligned}\alpha &= A_s \times \alpha_s \\ &= A_{sg} \times \alpha_b\end{aligned} \quad (1)$$

When a seismic wave having the maximum ground surface seismic acceleration $\alpha_s$ (Gal) is inputted to the ground surface 4 near the structure 1, a horizontal displacement of the top surface 3, i.e. the inter-layer displacement δ (cm) of the first layer is obtained by Eq. (2) below.

$$\begin{aligned}\delta &= I/k \\ &= M \times \alpha/k \\ &= (M/k) \times A_s \times \alpha_s \\ &= (1/\omega^2) \times A_s \times \alpha_s \\ &= [1/(2\pi F_s)^2] \times A_s \times \alpha_s \\ &= (1/4\pi^2) \times (A_s/F_s^2) \times \alpha_s\end{aligned} \quad (2)$$

When a seismic wave having the maximum basement seismic acceleration $\alpha_b$ (Gal) is inputted to the basement 5 underneath the structure 1, a horizontal displacement of the top surface 3, i.e. the inter-layer displacement δ (cm) of the first layer is obtained by Eq. (3) below.

$$\begin{aligned}\delta &= I/k \\ &= M \times \alpha/k \\ &= (M/k) \times A_{sg} \times \alpha_b \\ &= (1/\omega^2) \times A_{sg} \times \alpha_b \\ &= [1/(2\pi F_s)^2] \times A_{sg} \times \alpha_b \\ &= (1/4\pi^2) \times (A_{sg}/F_s^2) \times \alpha_b\end{aligned} \quad (3)$$

where M is an effective mass related to vibration of the top surface 3, I is an inertial force which is generated in the effective mass M upon being subjected to an earthquake, k is a spring constant of a shear spring which represents rigidity related to vibration of the top surface 3, and ω is an angular frequency of vibration of the top surface 3. In actuality, the calculation of the horizontal displacement δ does not require these values. A displacement of the top surface 3 upon being subjected to an earthquake can be obtained based on the predominant frequency $F_s$ and amplification factor $A_s$ or $A_{sg}$ of the top surface 3 and the maximum ground surface seismic acceleration $\alpha_b$.

Expressing the height of the layer 2 as $h_1$ (m), the shear strain $\gamma$ ($10^{-6}$) of the layer 2 is obtained by Eq. (4) where the maximum ground surface seismic acceleration is used, or by Eq. (5) where the maximum seismic acceleration of the basement is used. 10000 appearing in Eqs. (4) and (5) is a coefficient to adjust the calculated shear strain γ to be in unit $10^{-6}$, when the seismic accelerations $\alpha_s$ and $\alpha_b$ used in obtaining the inter-layer displacement δ are measured in units of Gal (cm/s²), and the height $h_1$ of the layer 2 is measured in units of meters (m).

$$\begin{aligned}\gamma &= 10000 \times \delta/h_1 \\ &= 10000 \times (1/4\pi^2) \times (A_s/F_s^2) \times \alpha_s/h_1 \\ &= (2500A_s/\pi^2 F_s^2 h_1) \times \alpha_s\end{aligned} \quad (4)$$

$$\begin{aligned}\gamma &= 10000 \times \delta/h_1 \\ &= 10000 \times (1/4\pi^2) \times (A_{sg}/F_s^2) \times \alpha_b/h_1 \\ &= (2500A_{sg}/\pi^2 F_s^2 h_1) \times \alpha_b\end{aligned} \quad (5)$$

When the maximum ground surface seismic acceleration is used, the maximum shear strain $\gamma$ ($10^{-6}$), described later, to be generated in the layer 2 can be estimated by multiplying together the seismic vulnerability index $K_s$ expressed by Eq. (6) and the maximum ground surface seismic acceleration $\alpha_s$ upon being subjected to an earthquake.

$$K_s = 2500A_s/\pi^2 F_s^2 h_1 \quad (6)$$

Likewise, when the maximum basement seismic acceleration is used, the maximum shear strain $\gamma$ ($10^{-6}$) to be generated in the layer 2 can be estimated by multiplying together the seismic vulnerability index $K_{sg}$ expressed by Eq. (7) and the maximum basement seismic acceleration $\alpha_b$ upon being subjected to an earthquake.

$$K_{sg} = 2500 A_{sg}/\pi^2 F_s^2 h_1 \qquad (7)$$

A method for obtaining a seismic vulnerability index and the shear strain of an arbitrary layer of a structure will next be described.

Figure 4:
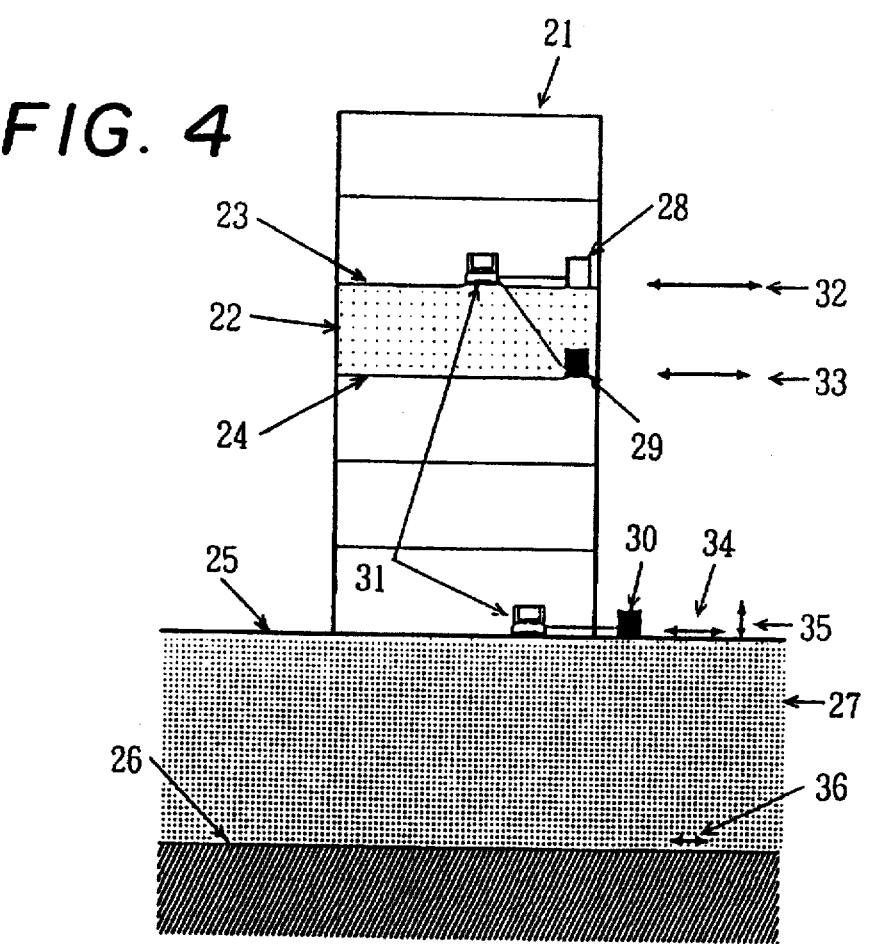
FIG. 4 is an explanatory diagram showing a second embodiment of the present invention in which, variations are measured to determine the seismic vulnerability of an arbitrary layer of a structure.

FIG. 4 shows a second embodiment of the present invention, in which vibrations are measured to determine the seismic vulnerability of an arbitrary layer of a multi-layer structure.

Using the above-mentioned method according to the first embodiment for obtaining the seismic vulnerability of the first layer (a layer in contact with the ground), an interlayer deformation of an n-th layer 22 (a layer for which seismic vulnerability is to be determined) of a multi-layer structure 21 is obtained so as to determine a seismic vulnerability index of the n-th layer 22.

A transfer function of vibration traveling from the ground surface 25 to the top surface 23 of the n-th layer 22 of the multi-layer structure 21 is estimated based on a spectral ratio between a horizontal component 32 of the vibration recorded on the top surface 23 and a horizontal component 34 of the vibration recorded on the ground surface 25. The predominant frequency $F_{su}$ and amplification factor $A_{su}$ of vibration traveling from the ground surface 25 to the top surface 23 can be obtained based on this estimated transfer function.

Likewise, a transfer function of vibration traveling from the ground surface 25 to a bottom surface 24 of the n-th layer 22 is estimated based on a spectral ratio between a horizontal component 33 of the vibration recorded on the bottom surface 24 and the horizontal component 34 of the vibration recorded on the ground surface 25. The predominant frequency $F_{sd}$ and amplification factor $A_{sd}$ of vibration traveling from the ground surface 25 to the bottom surface 24 can be obtained based on this estimated transfer function.

A transfer function of vibration traveling from a basement 26 to the top surface 23 of the n-th layer 22 can be estimated based on the spectral ratio between the horizontal component 32 of the vibration recorded on the top surface 23 and a vertical component 35 of the vibration recorded on the ground surface 25. The amplification factor $A_{sgu}$ of vibration traveling from the basement 26 to the top surface 23 can be obtained based on this estimated transfer function.

Likewise, a transfer function of vibration traveling the basement 26 to the bottom surface 24 of the n-th layer 22 can be estimated based on the spectral ratio between the horizontal component 33 of the vibration recorded on the bottom surface 24 and the vertical component 35 of the vibration recorded on the ground surface 25. The amplification factor $A_{sgd}$ of vibration traveling from the basement 26 to the bottom surface 24 can be obtained based on this estimated transfer function. Reference numeral 27 denotes a surface layer, reference numeral 28 denotes a vibration sensor placed on the top surface 23 of the n-th layer 22, reference numeral 29 denotes a vibration sensor placed on the bottom surface 24 of the n-th layer 22, reference numeral 30 denotes a vibration sensor placed on the ground surface 25, and reference numeral 31 denotes a seismic vulnerability data processor, which has the same structure as that of the seismic vulnerability data processor 9 of the first embodiment. Reference numeral 36 denotes the horizontal component of vibration at the basement 26.

A horizontal displacement of the top surface 23 of the n-th layer 22 and a horizontal displacement of the bottom surface 24 of the n-th layer 22 when a seismic wave having the maximum ground surface seismic acceleration $\alpha_s$ (Gal) is inputted to the ground surface 25 near the structure 21 are obtained by Eq. (2). The inter-layer displacement $\delta$ (cm) of the n-th layer 22 is obtained by taking the difference between these horizontal displacements, as expressed below by Eq. (8).

$$\begin{aligned}\delta &= (1/4\pi^2) \times (A_{su}/F_{su}^2) \times \alpha_s - (1/4\pi^2) \times (A_{sd}/F_{sd}^2) \times \alpha_s \\ &= (1/4\pi^2) \times [(A_{su}/F_{su}^2) - (A_{sd}/F_{sd}^2)] \times \alpha_s\end{aligned} \qquad (8)$$

A horizontal displacement of the top surface 23 of the n-th layer 22 and a horizontal displacement of the bottom surface 24 of the n-th layer 22 when a seismic wave having the maximum basement seismic acceleration $\alpha_b$ (Gal) is inputted to the basement 26 underneath the structure 21 are obtained by Eq. (2). The inter-layer displacement $\delta$ (cm) of the n-th layer 22 is obtained by taking the difference between these horizontal displacements, as expressed below by Eq. (9).

$$\begin{aligned}\delta &= (1/4\pi^2) \times (A_{sgu}/F_{su}^2) \times \alpha_b - (1/4\pi^2) \times (A_{sgd}/F_{sd}^2) \times \alpha_b \\ &= (1/4\pi^2) \times [(A_{sgu}/F_{su}^2) - (A_{sgd}/F_{sd}^2)] \times \alpha_b\end{aligned} \qquad (9)$$

Expressing the height of the n-th layer 22 as $h_n$ (m), the shear strain $\gamma$ ($10^{-6}$) of the n-th layer 22 is obtained by Eq. (10) where the maximum ground surface seismic acceleration is used, or by Eq. (11) where the maximum basement seismic acceleration is used. 10000 appearing in Eqs. (10) and (11) is a coefficient to adjust the calculated shear strain $\gamma$ to be in unit $10^{-6}$, when the seismic accelerations $\alpha_s$ and $\alpha_b$ used in obtaining inter-layer displacement $\delta$ are measured in units of Gal (cm/s$^2$), and the height $h_n$ of the n-th layer 22 is measured in units of meters (m).

$$\begin{aligned}\gamma &= 10000 \times \delta_s/h_n \\ &= 10000 \times (1/4\pi^2) \times [(A_{su}/F_{su}^2) - (A_{sd}/F_{sd}^2)] \times \alpha_s/h_n \\ &= (2500/\pi^2 h_n) \times [(A_{su}/F_{su}^2) - (A_{sd}/F_{sd}^2)] \times \alpha_s\end{aligned} \qquad (10)$$

$$\begin{aligned}\gamma &= 10000 \times \delta_b/h_n \\ &= 10000 \times (1/4\pi^2) \times [(A_{sgu}/F_{su}^2) - (A_{sgd}/F_{sd}^2)] \times \alpha_b/h_n \\ &= (2500/\pi^2 h_n) \times [(A_{sgu}/F_{su}^2) - (A_{sgd}/F_{sd}^2)] \times \alpha_b\end{aligned} \qquad (11)$$

When the maximum ground surface seismic acceleration is used, the maximum shear strain $\gamma$ ($10^{-6}$) to be generated in the n-th layer 22 can be estimated by multiplying together the seismic vulnerability index $K_{sn}$ expressed by Eq. (12) and the maximum ground surface seismic acceleration $\alpha_s$ upon being subjected to an earthquake.

$$K_{sn} = (2500/\pi^2 h_n) \times [(A_{su}/F_{su}^2) - (A_{sd}/F_{sd}^2)] \qquad (12)$$

Likewise, when the maximum basement seismic acceleration is used, the maximum shear strain $\gamma$ ($10^{-6}$) to be generated in the n-th layer 22 can be estimated by multiplying together the seismic vulnerability index $K_{sgn}$ expressed by Eq. (13) and the maximum basement seismic acceleration $\alpha_b$ upon being subjected to an earthquake.

$$K_{sgn} = (2500/\pi^2 h_n) \times [(A_{sgu}/F_{su}^2) - (A_{sgd}/F_{sd}^2)] \qquad (13)$$

The present invention will now be described by way of more concrete examples.

Seismic diagnosis of a two-story wood house using microtremors will be described as an example of the method for obtaining the seismic vulnerability of the first layer of a structure.

Figure 5:
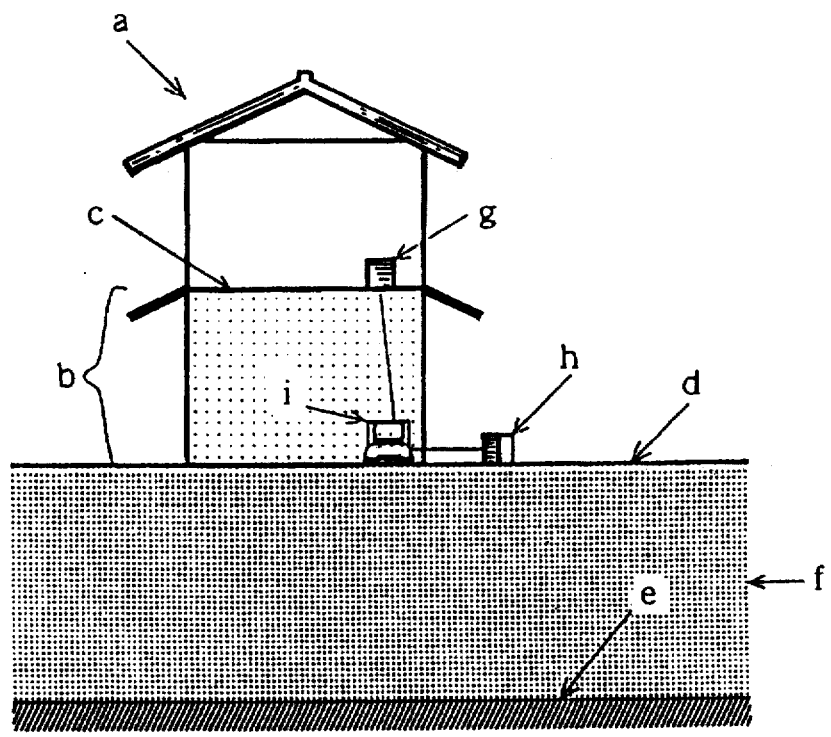
FIG. 5 is an explanatory diagram illustrating a third embodiment of the present invention, in which microtremors of a two-story wood house are measured.

FIG. 5 shows a third embodiment of the present invention, in which microtremors for a two-story wood house are measured.

In order to determine seismic vulnerability resulting from a deformation for layer b (a layer for which seismic vulnerability is determined) corresponding to the first story of a two-story wood house a, a vibration sensor g was placed on a floor c of the second story (on the upper surface of the layer b), and a vibration sensor h was placed on a ground surface d. Using these vibration sensors g and h, microtremors of the floor c as well as the ground surface d were concurrently measured, thereby obtaining a spectral ratio. Symbol f denotes a surface layer, and symbol i denotes a seismic vulnerability data processor, which has the same structure as that of the seismic vulnerability data processor 9 described above.

Figure 6:
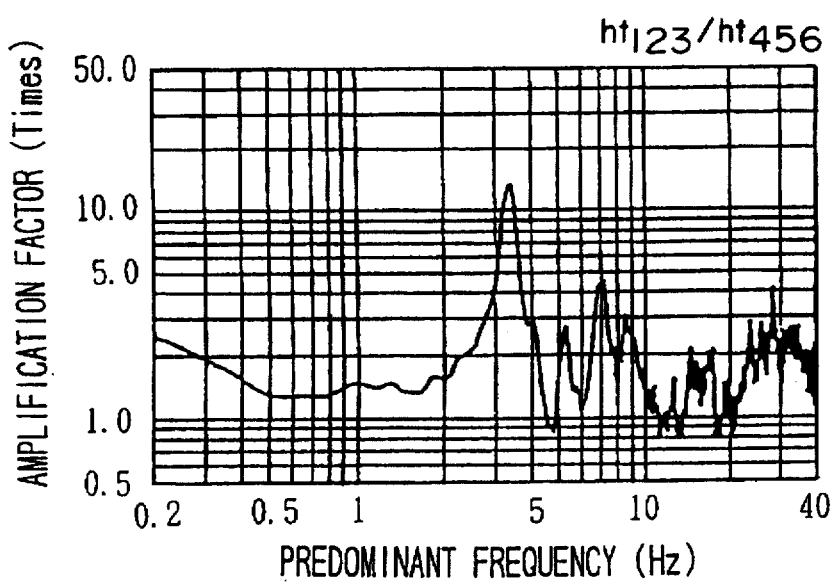
FIG. 6 is a graph of a spectral ratio between the horizontal component of microtremors recorded on the second floor of the house of FIG. 5 and the horizontal component of microtremors recorded on ground surface d of FIG. 5 (an estimated transfer function of vibration traveling from the ground surface to the second floor) according to the third embodiment.

FIG. 6 shows a spectral ratio between the horizontal component of microtremors recorded on the floor c of the second story of FIG. 5 and the horizontal component of microtremors recorded on the ground surface d (an estimated transfer function of vibration traveling from the ground surface d to the floor c). Based on the first peak of FIG. 6, predominant frequency $F_s=3.39$ Hz and amplification factor $A_s=13.4$ can be obtained.

FIG. 7 shows a spectral ratio between the horizontal component of microtremors recorded on the floor c of the second story of FIG. 5 and the vertical component of microtremors recorded on the ground surface d (an estimated transfer function of vibration traveling from the basement e to the floor c). Based on a peak of FIG. 7, amplification factor $A_{sg}=21.6$ times can be obtained.

Taking the height of the layer b corresponding to the first story of the two-story wood house a as 2.8 m, the seismic vulnerability index $K_s=105$ is obtained which is used when seismic vulnerability is determined using the maximum ground surface seismic acceleration $\alpha_s$ upon being subjected to an earthquake. TABLE 1 shows shear strain $\gamma$ $(10^{-6})$ obtained for the maximum ground surface seismic acceleration $\alpha_s=100$ Gal, 200 Gal, and 300 Gal upon being subjected to an earthquake.

A shear strain which causes damage to a wood house is said to be about $\frac{1}{60}$ radian ($\approx 17000 \times 10^{-6}$). Hence, this two-story wood house a may not be damaged at 100 Gal in the maximum ground surface seismic acceleration $\alpha_s$, but may be damaged at 200 Gal and 300 Gal.

TABLE 1

| Maximum ground surface seismic acceleration $\alpha_s$ (Gal) | 100 | 200 | 300 |
|---|---|---|---|
| Shear strain $\gamma_s$ (× $10^{-6}$) | 10500 | 21000 | 31500 |

Taking the height of the layer b corresponding to the first story of the two-story wood house a as 2.8 m, seismic vulnerability index $K_{sg}=170$ is obtained which is used when seismic vulnerability is determined using the maximum basement seismic acceleration $\alpha_b$ upon being subjected to an earthquake. TABLE 2 shows shear strain $\gamma$ $(10^{-6})$ obtained for the maximum basement seismic acceleration $\alpha_b=50$ Gal, 100 Gal, and 150 Gal upon being subjected to an earthquake.

A shear strain which causes damage to a wood house is said to be about $\frac{1}{60}$ radian ($\approx 17000 \times 10^{-6}$). Hence, this two-story wood house a may not be damaged at 50 Gal in the maximum basement seismic acceleration $\alpha_b$, but may begin to be damaged at about 100 Gal and may be damaged at 150 Gal.

TABLE 2

| Maximum basement seismic acceleration $\alpha_b$ (Gal) | 50 | 100 | 150 |
|---|---|---|---|
| Shear strain $\gamma_{sg}$ (× $10^{-6}$) | 8500 | 17000 | 25500 |

A fourth embodiment of the present invention will now be described.

In an example described below, a method for determining the seismic vulnerability of a structure according to the fourth embodiment is applied to a high-rise building having one basement and 19 stories.

This high-rise building whose seismic vulnerability is to be determined is located in the hypocentral region of the 1995 Hyogo-Ken Nanbu Earthquake and experienced seismic vibration having a seismic intensity of 7. No apparent damage is not observed with this high-rise building, so the building is still in use. However, the building is highly likely to be reduced in antiseismic strength.

FIG. 8 shows schematically the high-rise building subjected to measurement by the method of the fourth embodiment.

In this embodiment, three stories of the high-rise building j were taken as one layer, namely the first through third stories as first layer k1, the fourth through sixth stories as second layer k2, the seventh through ninth stories as third layer k3, the tenth through twelfth stories as fourth layer k4, the thirteenth through fifteenth stories as fifth layer k5, and the sixteenth through eighteenth stories as sixth layer k6. The average shear strain $\gamma$ of these layers was obtained, thereby determining the seismic vulnerability of the high-rise building j.

TABLE 3 shows the predominant frequency $F_s$ and amplification factor $A_s$ of vibration traveling from the ground surface m to the floor surface of a story and the amplification factor $A_{sg}$ of vibration traveling from the basement n to the floor surface of a story. These values were obtained using a first peak of a spectral ratio between the horizontal component of the vibration recorded on each layer of the high-rise building j and the vertical component of the vibration recorded on the ground surface m. TABLE 4 shows the seismic vulnerability index $K_{sgn}$ and shear strain $\gamma$ of each layer. Height $h_n$ of each layer is 9.6 m, and the maximum basement seismic acceleration $\alpha_b$ upon being subjected to an earthquake was taken as 100 Gal.

A shear strain $\gamma$ which causes damage to a reinforced concrete building is said to be about $\frac{1}{250}$ radian ($\approx 4000 \times 10^{-6}$). Since the shear strain $\gamma$ is very large, about 6 to 20 times $\frac{1}{250}$ radian, for the first through fifth layers, this high-rise building j is likely to be significantly damaged upon being subjected even to earthquake having the maximum basement seismic acceleration $\alpha_b$ of about 100 Gal. Particularly, the vulnerability of the second layer is high, implying that the second layer may collapse.

TABLE 3

|  | $F_s$ (Hz) | $A_s$ | $A_{sg}$ |
|---|---|---|---|
| 19th floor | 0.59 | 35.1 | 33.5 |
| 16th floor | 0.59 | 35.1 | 33.6 |
| 13th floor | 0.61 | 32.6 | 29.1 |
| 10th floor | 0.61 | 28.5 | 25.4 |
| 7th floor | 0.59 | 18.3 | 17.1 |
| 4th floor | 0.59 | 6.7 | 6.2 |
| 1st floor | 0.59 | 1.1 | 1.0 |

TABLE 4

|  | $K_{sgn}$ | $\gamma_{sgn}$ $(10^{-6})$ |
|---|---|---|
| 6th layer (16th–18th floors) | −8 | −800 |
| 5th layer (13th–15th floors) | 346 | 34600 |
| 4th layer (10th–12th floors) | 260 | 26000 |
| 3rd layer (7th–9th floors) | 589 | 58900 |
| 2nd layer (4th–6th floors) | 825 | 82500 |
| 1st layer (1st–3rd floors) | 396 | 39600 |

The present invention is not limited to the above-described embodiments. Numerous modifications and variations of the present invention are possible in light of the spirit of the present invention, and they are not excluded from the scope of the present invention.

What is claimed is:

1. A method for determining the seismic vulnerability of a structure, said method comprising the steps of:
   (a) placing a vibration sensor on each of the top surface of a layer of the structure and the ground surface near the structure so as to record vibrations;
   (b) estimating a transfer function of vibration of the top surface of the layer of the structure based on a spectral ratio between the vibration recorded on the top surface of the layer of the structure and the vibration recorded on the ground surface near the structure, thereby obtaining a predominant frequency and amplification factor of vibration of the top surface of the layer of the structure;
   (c) obtaining a seismic vulnerability index of the layer of the structure resulting from a deformation of the layer based on the obtained predominant frequency and amplification factor of vibration of the top surface of the layer of the structure and on the height of the layer of the structure; and
   (d) multiplying this seismic vulnerability index by an assumed seismic acceleration, thereby obtaining a maximum shear strain of the layer of the structure upon being subjected to an earthquake.

2. A method for determining the seismic vulnerability of a structure according to Claim 1, wherein the seismic vulnerability index of the layer of the structure is obtained using a predominant frequency and an amplification factor which are obtained based on a spectral ratio between the horizontal component of the vibration recorded on the top surface of the layer of the structure and the horizontal component of the vibration recorded on the ground surface near the structure, and the seismic vulnerability index is multiplied by an assumed maximum ground surface seismic acceleration upon being subjected to an earthquake, thereby obtaining the shear strain of the layer of the structure.

3. A method for determining the seismic vulnerability of a structure according to claim 1, wherein the seismic vulnerability index of the layer of the structure is obtained using a predominant frequency which is obtained based on a spectral ratio between the horizontal component of the vibration recorded on the top surface of the layer of the structure and the horizontal component of the vibration recorded on the ground surface near the structure, as well as using an amplification factor which is obtained based on a spectral ratio between the horizontal component of the vibration recorded on the top surface of the layer of the structure and the vertical component of the vibration recorded on the ground surface near the structure, wherein amplification of seismic motion of a surface layer is taken into consideration during the calculation of the seismic vulnerability index, and the seismic vulnerability index is multiplied by an assumed maximum basement seismic acceleration upon being subjected to an earthquake, thereby obtaining the shear strain of the layer of the structure.

4. A method for determining the seismic vulnerability of a structure, said method comprising the steps of:
   (a) placing a vibration sensor on each of the top surface of a layer of the structure, the bottom surface of the layer of the structure, and the ground surface near the structure so as to record vibrations;
   (b) estimating a transfer function of vibration of the top surface of the layer of the structure based on a spectral ratio between the vibration recorded on the top surface of the layer of the structure and the vibration recorded on the ground surface near the structure, thereby obtaining a predominant frequency and amplification factor of vibration of the top surface of the layer of the structure;
   (c) estimating a transfer function of vibration of the bottom surface of the layer of the structure based on a spectral ratio between the vibration recorded on the bottom surface of the layer of the structure and the vibration recorded on the ground surface near the structure, thereby obtaining a predominant frequency and amplification factor of vibration of the bottom surface of the layer of the structure;
   (d) obtaining a seismic vulnerability index of the layer of the structure resulting from a deformation of the layer based on the obtained predominant frequency and amplification factor of vibration of the top surface of the layer of the structure, on the obtained predominant frequency and amplification factor of vibration of the bottom surface of the layer of the structure, and on height of the layer of the structure; and
   (e) multiplying this seismic vulnerability index by an assumed seismic acceleration, thereby obtaining a shear strain of the layer of the structure.

5. A method for determining the seismic vulnerability of a structure according to claim 4, wherein the seismic vulnerability index of the layer of the structure is obtained using a predominant frequency and an amplification factor which are obtained based on a spectral ratio between the horizontal component of the vibration recorded on the top and bottom surfaces of the layer of the structure and the horizontal component of the vibration recorded on the ground surface near the structure, and the seismic vulnerability index is multiplied by an assumed maximum ground surface seismic acceleration upon being subjected to an earthquake, thereby obtaining the shear strain of the layer of the structure.

6. A method for determining the seismic vulnerability of a structure according to claim 4, wherein the seismic vulnerability index of the layer of the structure is obtained using a predominant frequency which is obtained based on a spectral ratio between the horizontal component of the vibration recorded on the top and bottom surfaces of the layer of the structure and the horizontal component of the vibration recorded on the ground surface near the structure, as well as using an amplification factor which is obtained based on a spectral ratio between the horizontal component of the vibration recorded on the top and bottom surfaces of the layer of the structure and the vertical component of the vibration recorded on the ground surface near the structure, wherein amplification of seismic motion of a surface layer is taken into consideration in the calculation of the seismic vulnerability index, and the seismic vulnerability index is multiplied by an assumed maximum basement seismic acceleration upon being subjected to an earthquake, thereby obtaining the shear strain of the layer of the structure.

7. A method for determining the seismic vulnerability of a structure according to claim 1, wherein the vibrations are microtremors.

8. An apparatus for determining the seismic vulnerability of a structure, said apparatus comprising:

(a) a first vibration sensor for recording vibration, which is placed on the top surface of a layer of a structure;

(b) a second vibration sensor for recording vibration, which is placed on the ground surface near the structure; and (c) a seismic vulnerability data processor, which is connected to said vibration sensors and which determines the seismic vulnerability of the structure based on the recorded vibrations, wherein said seismic vulnerability data processor carries out processing for estimating a transfer function of vibration of the top surface of the layer of the structure based on a spectral ratio between the vibration recorded by the first vibration sensor and the vibration recorded by the second vibration sensor, thereby obtaining a predominant frequency and amplification factor of vibration of the top surface of the layer of the structure; for obtaining a seismic vulnerability index of the layer of the structure resulting from a deformation of the layer, based on the obtained predominant frequency and amplification factor of vibration of the top surface of the layer of the structure and on the height of the layer of the structure; and for multiplying this seismic vulnerability index by an assumed seismic acceleration, thereby obtaining a maximum shear strain of the layer of the structure upon being subjected to an earthquake.

9. An apparatus for determining the seismic vulnerability of a structure according to claim 8, wherein said seismic vulnerability data processor obtains the seismic vulnerability index of the layer of the structure fusing a predominant frequency and an amplification factor which are obtained based on a spectral ratio between the horizontal component of the vibration recorded on the top surface of the layer of the structure and the horizontal component of the vibration recorded on the ground surface near the structure, and multiplies the seismic vulnerability index by an assumed maximum ground surface seismic acceleration upon being subjected to an earthquake, thereby obtaining the shear strain of the layer of the structure.

10. An apparatus for determining the seismic vulnerability of a structure according to claim 8, wherein said seismic vulnerability data processor obtains the seismic vulnerability index of the layer of the structure using a predominant frequency which is obtained based on a spectral ratio between the horizontal component of the vibration recorded on the top surface of the layer of the structure and the horizontal component of the vibration recorded on the ground surface near the structure, as well as using an amplification factor which is obtained based on a spectral ratio between the horizontal component of the vibration recorded on the top surface of the layer of the structure and the vertical component of the vibration recorded on the ground surface near the structure, wherein amplification of seismic motion of a surface layer is taken into consideration in the calculation of the seismic vulnerability, and the seismic vulnerability data processor then multiplies the seismic vulnerability index by an assumed maximum basement seismic acceleration upon being subjected to an earthquake, thereby obtaining the shear strain of the layer of the structure.

11. An apparatus for determining the seismic vulnerability of a structure, said apparatus comprising:

(a) a first vibration sensor for recording vibration which is placed on the top surface of a layer of the structure;

(b) a second vibration sensor for recording vibration which is placed on the bottom surface of the layer of the structure;

(c) a third vibration sensor for recording vibration which is placed on the ground surface near the structure; and (d) a seismic vulnerability data processor which is connected to said vibration sensors and which determines the seismic vulnerability of the structure based on the recorded vibrations, wherein said seismic vulnerability data processor carries out processing for estimating a transfer function of vibration of the top surface of the layer of the structure based on a spectral ratio between the vibration recorded by the first vibration sensor and the vibration recorded by the third vibration sensor, thereby obtaining a predominant frequency and amplification factor of vibration of the top surface of the layer of the structure; for estimating a transfer function of vibration of the bottom surface of the layer of the structure based on a spectral ratio between the vibration recorded by the second vibration sensor and the vibration recorded by the third vibration sensor, thereby obtaining a predominant frequency and amplification factor of vibration of the bottom surface of the layer of the structure; for obtaining a seismic vulnerability index of the layer of the structure resulting from a deformation of the layer based on the obtained predominant frequency and amplification factor of vibration of the top surface of the layer of the structure, on the obtained predominant frequency and amplification factor of vibration of the bottom surface of the layer of the structure, and on the height of the layer of the structure; and for multiplying this seismic vulnerability index by an assumed seismic acceleration, thereby obtaining a shear strain of the layer of the structure.

12. An apparatus for determining the seismic vulnerability of a structure according to claim 11, wherein said seismic vulnerability data processor obtains the seismic vulnerability index of the layer of the structure using a predominant frequency and an amplification factor which are obtained based on a spectral ratio between the horizontal component of the vibration recorded on the top and bottom surfaces of the layer of the structure and the horizontal component of the vibration recorded on the ground surface near the structure, and multiplies this seismic vulnerability index by an assumed maximum ground surface seismic acceleration upon being subjected to an earthquake, thereby obtaining the shear strain of the layer of the structure.

13. An apparatus for determining the seismic vulnerability of a structure according to claim 11, wherein said seismic vulnerability data processor obtains the seismic vulnerability index of the layer of the structure using a predominant frequency which is obtained based on a spectral ratio between the horizontal component of the vibration recorded on the top and bottom surfaces of the layer of the structure and the horizontal component of the vibration recorded on the ground surface near the structure, as well as using an amplification factor which is obtained based on a spectral ratio between the horizontal component of the vibration recorded on the top and bottom surfaces of the layer of the structure and the vertical component of the vibration recorded on the ground surface near the structure, wherein amplification of seismic motion of a surface layer is taken into consideration in the calculation of the seismic vulnerability index, and said seismic vulnerability data processor then multiplies the seismic vulnerability index by an assumed maximum basement seismic acceleration upon being subjected to an earthquake, thereby obtaining the shear strain of the layer of the structure.

14. An apparatus for determining the seismic vulnerability of a structure according to claim 8, wherein said vibration sensors detect microtremors.

* * * * *

UNITED STATES PATENT AND TRADEMARK OFFICE
CERTIFICATE OF CORRECTION

PATENT NO. : 5,663,501
DATED     : September 2, 1997
INVENTOR(S) : NAKAMURA et al It is certified that error appears in the above-indentified patent and that said Letters Patent is hereby corrected as shown below:

Col. 15, line 38, "fusing" should read --using--.

Signed and Sealed this

Fifteenth Day of September, 1998

Attest:

BRUCE LEHMAN

Attesting Officer                Commissioner of Patents and Trademarks